(12) United States Patent
Schinkel et al.

(10) Patent No.: US 12,250,140 B2
(45) Date of Patent: Mar. 11, 2025

(54) METHOD OF OPTIMIZING A USAGE DISTRIBUTION IN A COMMUNICATIONS NETWORK

(71) Applicants: Fujitsu Technology Solutions GmbH, Munich (DE); Deutsche Telekom AG, Bonn (DE)

(72) Inventors: Fritz Schinkel, Munich (DE); Christian Münch, Munich (DE); Sebastian Engel, Munich (DE); Marc Geitz, Hagen (DE); Oliver Holschke, Berlin (DE); Timmy Schüller, Münster (DE)

(73) Assignees: Fujitsu Technology Solutions GmbH, Munich (DE); Deutsche Telekom AG, Bonn (DE)

( * ) Notice: Subject to any disclaimer, the term of this patent is extended or adjusted under 35 U.S.C. 154(b) by 0 days.

(21) Appl. No.: 18/288,744

(22) PCT Filed: Sep. 15, 2022

(86) PCT No.: PCT/EP2022/075647
§ 371 (c)(1),
(2) Date: Oct. 27, 2023

(87) PCT Pub. No.: WO2023/041645
PCT Pub. Date: Mar. 23, 2023

(65) Prior Publication Data
US 2024/0223494 A1     Jul. 4, 2024

(30) Foreign Application Priority Data

Sep. 20, 2021   (DE) .......................... 102021004716.8
Oct. 27, 2021   (EP) ..................................... 21205005

(51) Int. Cl.
*H04L 45/125*  (2022.01)
*H04L 47/125*  (2022.01)

(52) U.S. Cl.
CPC .......... *H04L 45/125* (2013.01); *H04L 47/125* (2013.01)

(58) Field of Classification Search
CPC ........................... H04L 45/125; H04L 47/125
See application file for complete search history.

(56) References Cited

U.S. PATENT DOCUMENTS

2016/0164781 A1   6/2016   Imai et al.
2017/0286852 A1   10/2017  Rezaie et al.
(Continued)

FOREIGN PATENT DOCUMENTS

JP   2016-111599 A    6/2016
WO   2021/157008 A1   8/2021

OTHER PUBLICATIONS

Juexiao Su et al., "Fast Embedding of Constrained SatisfactionProblem to Quantum Annealer with Minimizing Chain Length," Jun. 18, 2017, pp. 1-6, XP058367890, DOI: 10.1145/3061639.3062246.
(Continued)

*Primary Examiner* — Walli Z Butt
(74) *Attorney, Agent, or Firm* — DLA Piper LLP (US)

(57) ABSTRACT

A computer-implemented method of optimizing a usage distribution in a communications network uses a quantum concept processor. A set of traffic demands for a transfer of determined data volumes between origin nodes and destination nodes among the plurality of communication nodes is captured. The traffic demands are split into sub-demands. A set of optional communication paths for an individual routing of each sub-demand is specified. The edges within the set of optional communication paths are assigned a respective usage capacity limit. Fractional capacity usages of the edges
(Continued)

are calculated based on the respective usage capacity limit. The calculated fractional capacity usages are formulated as terms of a quadratic stress function. An optimized routing is determined by using a quantum concept processor, thereby selecting for each sub-demand one communication path from the set of optional communication paths such that the quadratic stress function is minimized.

15 Claims, 5 Drawing Sheets

(56) References Cited

U.S. PATENT DOCUMENTS

| | | | | |
|---|---|---|---|---|
| 2020/0204477 | A1* | 6/2020 | Rahman | H04L 65/612 |
| 2020/0396154 | A1* | 12/2020 | Fiaschi | H04L 45/125 |
| 2021/0211364 | A1* | 7/2021 | Feldmann | H04L 43/062 |
| 2021/0232364 | A1* | 7/2021 | Swenson | G06F 7/22 |
| 2023/0049956 | A1 | 2/2023 | Miyahara et al. | |

OTHER PUBLICATIONS

European Search Report dated Apr. 8, 2022 in counterpart European Application No. 21205005.8.
International Search Report dated Dec. 13, 2022 in counterpart International Application No. PCT/EP2022/075647.
Written Opinion dated Dec. 13, 2022 in counterpart International Application No. PCT/EP2022/075647.
Notice of Reason(s) for Rejection dated Nov. 26, 2024, of counterpart Japanese Patent Application No. 2023-570454.

* cited by examiner

$$\frac{1}{2}\sum_{(o,d,p)}\left(\left(\sum_{k\in P_{o,d}} x_{p,k}^{o,d}\right) - 1\right)^2 \mathrel{!}= 0$$

FIG 4A $$\sum_{\ell\in E}\left(\overbrace{\sum_{(o,d,p)}\sum_{k\in P_{o,d}}\sum_{\ell\in k}\frac{t_{(o,d,p)}}{c_\ell}x_{p,k}^{o,d}}^{2}\right)$$

METHOD OF OPTIMIZING A USAGE DISTRIBUTION IN A COMMUNICATIONS NETWORK

TECHNICAL FIELD

This disclosure pertains to a computer-implemented method of optimizing a usage distribution in a communications network in which data traffic is routed, wherein the communications network has a plurality of communication nodes connectable over edges (links) of communication paths for a routing of the data traffic, as well as a quantum concept processor configured to perform such a method as well as a computer program implemented to perform such a method.

BACKGROUND

Today's demands regarding data traffic in communications networks are increasing dramatically. With the recent introduction of 5G, more and more devices and applications push data traffic to new peaks. Moreover, the increasing demand of digitized and decentralized working as well as increasing streaming demands in the domestic environment of private households are other big contributors to this trend. These increasing amounts of data being transported through communications networks like the internet impose a significant challenge to Service Providers. To avoid congestion of communications networks and degradation of user experience, traffic engineering techniques can be deployed to complement the comparatively slow and expensive expansion of network infrastructure.

The most widely deployed engineering techniques for data traffic management in communications networks operate on the premise of communication paths computed with respect to link weights. These weights are often related to link capacities, i.e., the maximum amount of data per unit time that can be routed over a link from a starting node to an end node connected by that link respectively edge. The final routing from a origin node to an destination node of the data streams, under the consideration of interim nodes and given links or edges, is based on the identified paths of the shortest paths found. As a result, the most straight-forward and practically oriented technique to guide traffic demands is by manipulation of these link weights that can also be called link metrics or Interior Gateway Protocols (IGP) metrics. The higher the link weight of an edge, the higher the probability of data being routed over the respective edge. Following this approach, in a reactive manner, link weights are adapted locally whenever a certain link tends to be overloaded. In a more systematic manner, the problem has been further dealt with by applying linear integer computer programs, where the optimization targets are the minimization of the maximal link capacity usage in the network. The task of finding a globally optimal set of metrics, however, is very complex. In terms of computational complexity this task is NP-hard. This is because each link metric potentially impacts a large number of communication paths.

The linear optimization techniques applied so far quickly reach their limits when actual non-linear conditions are taken into account, like redundancies, geographical sub-groups or subdomains (e.g., European network and US network considered in one model), inclusion of satellites, Quality of Service, QOS, relationships and the like. Moreover, the known techniques often lead to the problem of unused capacity usage and overloads of link capacities in communication paths within a network, where many links are close to their capacity limit.

It could therefore be helpful to provide enhanced techniques that allow for an optimized utilization of communication paths within a communications network with respect to capacity limits, thereby achieving an optimized routing.

SUMMARY

We provide a computer-implemented method of optimizing a usage distribution in a communications network in which data traffic is routed, wherein the communications network has a plurality of communication nodes connectable over edges of communication paths for a routing of the data traffic, the method comprising: capturing a set of traffic demands, each traffic demand specifying a transfer of a determined data volume from an origin node to a destination node among the plurality of communication nodes, splitting the traffic demands into sub-demands, specifying a set of optional communication paths for an individual routing of each sub-demand, wherein edges within the set of optional communication paths are assigned a respective usage capacity limit, calculating, for each sub-demand, fractional capacity usages of the edges within the set of optional communication paths, the fractional capacity usages calculated based on the respective usage capacity limit, formulating the calculated fractional capacity usages as terms of a quadratic stress function, and determining, by using a quantum concept processor, an optimized routing by selecting for each sub-demand one communication path from the set of optional communication paths such that the quadratic stress function is minimized.

We also provide a quantum concept processor, configured to perform one or more steps of the method of optimizing a usage distribution in a communications network in which data traffic is routed, wherein the communications network has a plurality of communication nodes connectable over edges of communication paths for a routing of the data traffic, the method comprising: capturing a set of traffic demands, each traffic demand specifying a transfer of a determined data volume from an origin node to a destination node among the plurality of communication nodes, splitting the traffic demands into sub-demands, specifying a set of optional communication paths for an individual routing of each sub-demand, wherein edges within the set of optional communication paths are assigned a respective usage capacity limit, calculating, for each sub-demand, fractional capacity usages of the edges within the set of optional communication paths, the fractional capacity usages calculated based on the respective usage capacity limit, formulating the calculated fractional capacity usages as terms of a quadratic stress function, and determining, by using a quantum concept processor, an optimized routing by selecting for each sub-demand one communication path from the set of optional communication paths such that the quadratic stress function is minimized.

We further provide a computer program comprising instructions that, when the program is executed by one or more processors, that causes each of the one or more processors to perform one or more steps of the method of optimizing a usage distribution in a communications network in which data traffic is routed, wherein the communications network has a plurality of communication nodes connectable over edges of communication paths for a routing of the data traffic, the method comprising: capturing a set of traffic demands, each traffic demand specifying a transfer of a determined data volume from an origin node to a destination node among the plurality of communication nodes, splitting the traffic demands into sub-demands, specifying a set of optional communication paths for an individual routing of each sub-demand, wherein edges within the set of optional communication paths are assigned a respective usage capacity limit, calculating, for each sub-demand, fractional capacity usages of the edges within the set of optional communication paths, the fractional capacity usages calculated based on the respective usage capacity limit, formulating the calculated fractional capacity usages as terms of a quadratic stress function, and determining, by using a quantum concept processor, an optimized routing by selecting for each sub-demand one communication path from the set of optional communication paths such that the quadratic stress function is minimized.

We further yet provide a computer-readable storage medium on which the computer program comprising instructions that, when the program is executed by one or more processors, that causes each of the one or more processors to perform one or more steps of the method of optimizing a usage distribution in a communications network in which data traffic is routed, wherein the communications network has a plurality of communication nodes connectable over edges of communication paths for a routing of the data traffic, the method comprising: capturing a set of traffic demands, each traffic demand specifying a transfer of a determined data volume from an origin node to a destination node among the plurality of communication nodes, splitting the traffic demands into sub-demands, specifying a set of optional communication paths for an individual routing of each sub-demand, wherein edges within the set of optional communication paths are assigned a respective usage capacity limit, calculating, for each sub-demand, fractional capacity usages of the edges within the set of optional communication paths, the fractional capacity usages calculated based on the respective usage capacity limit, formulating the calculated fractional capacity usages as terms of a quadratic stress function, and determining, by using a quantum concept processor, an optimized routing by selecting for each sub-demand one communication path from the set of optional communication paths such that the quadratic stress function is minimized, is stored.

We also further provide a workplace for a network planner, configured to verify an optimized routing determined by the method of optimizing a usage distribution in a communications network in which data traffic is routed, wherein the communications network has a plurality of communication nodes connectable over edges of communication paths for a routing of the data traffic, the method comprising: capturing a set of traffic demands, each traffic demand specifying a transfer of a determined data volume from an origin node to a destination node among the plurality of communication nodes, splitting the traffic demands into sub-demands, specifying a set of optional communication paths for an individual routing of each sub-demand, wherein edges within the set of optional communication paths are assigned a respective usage capacity limit, calculating, for each sub-demand, fractional capacity usages of the edges within the set of optional communication paths, the fractional capacity usages calculated based on the respective usage capacity limit, formulating the calculated fractional capacity usages as terms of a quadratic stress function, and determining, by using a quantum concept processor, an optimized routing by selecting for each sub-demand one communication path from the set of optional communication paths such that the quadratic stress function is minimized.

We also further yet provide an interface arrangement comprising one or more interfaces to a plurality of communication nodes of a communications network in which data traffic is routed, wherein the interface arrangement is configured to automatically deploy an optimized routing determined by the method of optimizing a usage distribution in a communications network in which data traffic is routed, wherein the communications network has a plurality of communication nodes connectable over edges of communication paths for a routing of the data traffic, the method comprising: capturing a set of traffic demands, each traffic demand specifying a transfer of a determined data volume from an origin node to a destination node among the plurality of communication nodes, splitting the traffic demands into sub-demands, specifying a set of optional communication paths for an individual routing of each sub-demand, wherein edges within the set of optional communication paths are assigned a respective usage capacity limit, calculating, for each sub-demand, fractional capacity usages of the edges within the set of optional communication paths, the fractional capacity usages calculated based on the respective usage capacity limit, formulating the calculated fractional capacity usages as terms of a quadratic stress function, and determining, by using a quantum concept processor, an optimized routing by selecting for each sub-demand one communication path from the set of optional communication paths such that the quadratic stress function is minimized, to the communication nodes of the communications network.

LIST OF REFERENCE SIGNS 1 communications network
2, 2a-2f communication nodes
3, 3a-3f aggregation nodes
4 connections between adjacent nodes
5 set of traffic demands
5a-5c traffic demands
6 quantum concept processor
7 sub-demands
d destination node
e, e1, e2 edges
i1, i2 intermediary nodes
o origin node
p sub-demands with certain size p
k, k1, k2 potential communication paths

DETAILED DESCRIPTION

Our method is a computer-implemented procedure that optimizes a usage distribution in a communications network in which data traffic is routed, wherein the communications network has a plurality of communication nodes. The communication nodes are connected by edges of the communications network. A series of edges yields a communication path for a routing of the data traffic. Hence, an edge of a communication path in this context describes a connection between two adjacent nodes within a communication path.

The method comprises the following steps:
- capturing a set of traffic demands, each traffic demand specifying a transfer of a determined data volume from an origin node to a destination node among the plurality of communication nodes,
- splitting the traffic demands into sub-demands,
- specifying a set of optional communication paths for an individual routing of each sub-demand, wherein the edges within the set of optional communication paths are assigned a respective usage capacity limit,
- calculating, for each sub-demand, fractional capacity usages of the edges within the set of optional communication paths, the fractional capacity usages being calculated based on the respective usage capacity limit,
- formulating the calculated fractional capacity usages as terms of a quadratic stress function, and
- determining, by using a quantum concept processor, an optimized routing by selecting for each sub-demand one communication path from the set of optional communication paths such that the quadratic stress function is minimized.

This method reliably addresses the problem of routing network demands in a communications network along optimized communication paths such that the overall capacity in the network is optimally used, thereby avoiding that link capacities in the network are exceeded.

By applying the method, for every given sub-demand from the traffic demands, one optimal option for a communication path from the set of optional communication paths can be selected. The selection is chosen such that the capacity of all edges (links) in used communication paths within the network is respected as upper limit for the total volume of traffic demands routed along them and that the average load of all communication paths within a network is minimum. Further, a minimization of a maximum link utilization (MLU) can be achieved.

"Traffic demands" in this context are modelled as 3-tuples, defining an origin node (source of a data stream), an end node or destination node (destination of a data stream), and the determined data traffic to be transferred between origin and destination. The focus is on providing continuous data streams over the network, which are to be modelled and routed such that no data is lost during transmission by exceeding specified capacities on given transport links. Measurement for data transfer rates of such data stream requests or demands are currently specified in Gbps (Gigabit per second).

"Sub-demands" in this context are traffic demands split into fragments. Hence, one sub-demand represents a fragment of an initial traffic demand in terms of the data volume split into a determined data volume packet.

The optional communication paths in this context are in general not subject to any restrictions with regard to routing, path length or number of intermediary nodes in the network. However, the set of optional communication paths is pre-determined regarding each sub-demand that is to be transmitted through the network. In such a pre-determination useful or suitable paths can be considered in terms of latency (shortest possible paths, fewest possible IP hops), redundancy (the model should be redundant against failure of a connection), Domains (e.g., EU, US) or hierarchies (core network, access networks) and the like. For example, the set of optional communication paths is a subset of possible communication paths for each traffic demand or for each respective sub-demand. The set of optional communication paths is, for example, stored as a "path box" that can be accessed by the computer-implemented algorithm. Advantageously, as many divergent (most diverse or disjoint) paths as suitable are pre-selected in the path box to provide a sufficiently large solution space for solving the quadratic stress function, i.e., finding a (global) minimum, by the quantum concept processor. Such pre-selection can depend on the processing performance and capacity of the quantum concept processor.

Moreover, traffic demands in this context can theoretically be split into sub-demands with any even or uneven fragment size suitable for the practical implementation. This approach is to split each traffic demands into a plurality of sub-demands and to find for each sub-demand an optimal communication path through the network. In this way, the approach bases on the so-called Multi Commodity Flow Routing (MCFR) which is a kind of source routing. Such splitting of the traffic demands can depend on the processing performance and capacity of the quantum concept processor.

By calculating, for each sub-demand, fractional capacity usages of the edges within the set of optional communication paths and formulating the calculated fractional capacity usages as terms of a quadratic stress function, a quadratic optimization problem can be formulated to deal with the complexity of the above-explained optimization problem. The application of such a quadratic optimization problem has the effect that a quadratic stress function can be formulated which heavily penalizes a high capacity usage on individual edges of communication paths.

In this way, an optimized routing is determined by selecting for each sub-demand one communication path from the set of optional communication paths such that the quadratic stress function is minimized. The minimum of the quadratic stress function preferably is a global minimum, but can also be a local minimum.

The method, hence, has the technical effect and advantage of a uniformly minimal utilization of the network and distribution of the distance to the capacity limits within the network to achieve a uniformly minimal utilization of the network with respect to its capacity limits.

The underlying quadratic optimization problem, as mentioned above, is very complex. This is not only due to a potential impact of one selected communication path to other communication paths and a vast amount of data traffic to be managed between a plurality of origin nodes and destination nodes in the network. The problem is also very complex because there are many practical constraints that have to be taken into account. As more constraints are implemented, such problems become more complex and difficult to solve. This is problematic or difficult if traffic engineering solutions are needed fast, for example, as a reaction to an unexpected network failure or under consideration of further practical constraints like latency (shortest possible paths, fewest possible IP hops), redundancy (the model should be redundant against failure of one or more/ many edges, planned outages or maintenance of network links), Domains (EU, US) or hierarchies (core network, access networks) or the like. The herein described method advantageously shows its strength compared to conventional approaches more and more, the more complex the underlying problem is. In other words, for a complex optimization problem taking into consideration practical constraints as explained above, the method described herein has a significant strength over conventional techniques.

Our method makes use of an approach inspired by quantum computing. The calculation of optimized solutions of the quadratic stress function to determine optimized communication paths for all sub-demands of the set of traffic demands is performed by a so-called quantum concept processor. As a quantum concept processor, a processor is defined that solves a so called "Ising model" or the equivalent quadratic unconstrained binary problem. For example, this is a processor configured to solve an optimization problem by quantum annealing or quantum annealing emulation. Such a processor is, for example, based on conventional hardware technology, for example, based on complementary metal-oxide-semiconductor (CMOS) technology. An example of such quantum concept processor is a Fujitsu digital annealer. Alternatively, any other quantum processors can be used for our method, in future times also such technologies that are based on real quantum bit technologies. Further examples of such quantum concept processors are the quantum annealer of DWave (e.g., 5000Q), but also quantum gate computers (IBM, Rigetti, OpenSuperQ, IonQ or Honeywell) making use of quantum optimisation algorithms like QAOA or VQE.

In other words, a quantum concept processor as defined herein is a processor that realizes the concept of minimization of a so-called quadratic unconstrained binary optimization (QUBO) function, either on a special processor classic technology, a quantum gate computer or on a quantum annealer.

The method may further comprise the following steps:
specifying a set of path variables, wherein each path variable is associated with one of the sub-demands and one communication path from the set of optional communication paths,
formulating, in the quadratic stress function, path terms that connect the calculated fractional capacity usages of the edges of a respective communication path from the set of optional communication paths with the path variable associated with the respective communication path from the set of optional communication paths, and
calculating the path terms, by using the quantum concept processor, to choose for each sub-demand one communication path from the set of optional communication paths such that the quadratic stress function is minimized.

In this way, for each sub-demand an optimal routing between an origin node and a destination node on one selected communication path along a concatenation of connections between adjacent nodes in the network can be calculated individually. This offers an elegant implementation of a very flexible and variable routing of data traffic, in particular under consideration of the MCFR approach as explained above. Hence, different communication paths for different sub-demands (e.g., via different intermediary nodes) can be selected to avoid overloads or critical increase of the capacity usage at respective edges of communication paths in the network and distribute the overall capacity usage throughout the network in an optimized manner.

The connection of calculated fractional capacity usages of the edges within optional communication paths with path variables associated with respective communication paths allows for the calculation of an optimized solution (minimum) of the quadratic stress function for all sub-demands. In this way, an optimized selection of one path out of the path box for each sub-demand can be achieved to fulfil the above-explained optimization problem. Hence, an impact of a selected communication path for one sub-demand to other possible communication paths for other sub-demands can be mitigated. This allows for a very high degree of freedom in the routing, which nevertheless is very complex to solve. An optimized selection of respective paths from the path box for all sub-demands is performed by the quantum concept processor, as explained above.

In at least one implementation of the method, the path terms are calculated under consideration of a path condition that each sub-demand is routed along exactly one communication path from the set of optional communication paths. Such path condition forms a constraint or "boundary" for the method such that each sub-demand can only be assigned to exactly one path out of the path box. This avoids undesirable solutions and guarantees that a routing of each sub-demand is sufficiently considered.

The traffic demands may be split into sub-demands with determined discrete data volumes. The sub-demands can each have an equal size or different sizes, depending on the implementation and practical considerations. For example, a traffic demand with a volume size of 1000 Gbit/s is split into a plurality of sub-demands with even sizes of 50 Gbit/s. Alternatively, sub-demands with different sizes are generated, wherein different sub-demands may have, for example, different sizes of 50, 100, and 250 Gbit/s. A splitting of the traffic demands into sub-demands with determined discrete data volumes has the effect of a practically implementable algorithmic procedure within the network and helps keeping control of stable and reliable data streams. In this way, such approach is a kind of discrete MCFR approach.

The quadratic stress function may be formulated under consideration of one or both of the following constraints for the set of traffic demands or for the respective sub-demands:
organization of the communications network in different network domains, and
latency of the communications network.

By considering such constraints in the formulation of the quadratic stress function, solutions of the optimization problem can be penalized that contravene the above conditions. This enables finding suitable optimized solutions considering practical constraints of the actual network conditions of the communications network.

The set of optional communication paths for an individual routing of each sub-demand may be specified under consideration of one or more of the following constraints:
one or more redundant optional communication paths associated with a sub-network of the communications network,
organization of the communications network in different network domains, and
latency of the communications network.

This has the advantageous effect that the calculation of an optimized routing can react to and compensate a failure in a zone, segment or sub-network within the communications network, consider different domains of the network and/or react to and compensate a latency in the network. This also gives further additional degrees of freedom that allow for respective sub-networks, domains and latency to be emphasized in the calculation of an optimized routing of all sub-demands. For example, certain zones or regions in the communications network can have greater significance, importance or use density than other zones or regions. This can be countered by such measures. Also, the communications network can be segmented into different sub-networks to better handle different latency requirements in this regard.

The set of optional communication paths for an individual routing of each sub-demand may be specified such that for topologically near origin and destination nodes a smaller number of optional communications paths is selected than for topologically distant origin and destination nodes. This has the advantage that all possible combinations and options for communication paths can be condensed to a suitable number of optional paths in the path box for each respective sub-demand. For topologically near origin and destination nodes a smaller number of optional communications paths is sufficient, whereas for topologically distant origin and destination nodes a higher number of optional communications paths is recommended. For near origin and destination nodes rather short paths are preferred, whereas for distant origin and destination nodes sufficient alternative routes or detours can be taken into account. With increasing "distance" between origin and destination nodes, hence, each of suitable and sufficient options and alternatives can be pre-determined as optional communications paths, without overstraining the complexity of the algorithm.

The quadratic stress function may be formulated as a quadratic unconstrained binary optimization (QUBO) function. This QUBO function serves as "input" for the quantum concept processor that solves this optimization problem for an optimized routing of all sub-demands according to the above-explained method. Generally speaking, QUBOs are quadratic order polynomials in binary variables which are represented in a quantum concept processor as bits or quantum bits (Q-bits hereinafter). In the context of the optimization problem, the QUBO function represents the sum of potential contributions of the fractional capacity usages of respective edges within optional communication paths as a function of different Q-bits, wherein each Q-bit represents the selection of a path alternative that can assume the value "0" or the value "1." To solve the quadratic optimization problem (quadratic stress function), the quantum concept processor runs through different settings of the different Q-bits to find such solution(s) that minimize the quadratic optimization problem. In this way, a QUBO representation of the optimization problem has elegant properties regarding the here applied quantum concept computing. For example, the above explained path variables are formulated in the form of such Q-bits.

The quadratic stress function and the path condition, as explained above, may be combined into a global QUBO function. In the global QUBO function one or more of the above-explained constraints can be considered. In this regard, one or more of the above-explained constraints can be weighted within the QUBO function as soft constraints. This has the advantage that the QUBO function can be somewhat fine-tuned depending on the focus of the optimization problem either on the optimization of the uniform capacity usage distribution throughout the network or on the fulfilment of one or more of the mentioned (soft) constraints.

The above-mentioned problem is also solved by a quantum concept processor. The quantum concept processor is configured to perform one or more steps of a method as described above. According to an example, the quantum concept processor is a digital annealing processing unit. This unit can be specially configured to perform quantum annealing or a quantum annealing emulation as explained above. The quantum concept processor can be of any type explained above.

Moreover, the above-mentioned problem is also solved by a computer program comprising instructions that, when the program is executed by one or more processors, cause each of the one or more processors to perform one or more steps of a method as described above. At least one of these processors is, e.g., a quantum concept processor as explained above. Other processors can be configured for processing, by executing the computer program, preparatory or iterative steps of or for a method as explained above.

Moreover, the above-mentioned problem is also solved by a workplace for a network planner, configured for verifying an optimized routing determined by a method as described above. Such a workplace, for example, has verification means configured for an (automated or semi-automated) verification of an optimized routing determined by a method as described above. This serves a network planner to verify optimization results found by a method as described above. The verification means can be implemented in software and/or hardware. For example, the workplace can communicate or be connected to a system comprising a quantum concept processor that performs the method as described above. The results can then be taken over into the workplace.

Moreover, the above-mentioned problem is also solved by an interface arrangement comprising one or more interfaces to a plurality of communication nodes of a communications network in which data traffic is routed, wherein the interface arrangement is configured to automatically deploy an optimized routing determined by a method as described above to the communication nodes of the communications network. In this way, an optimized routing determined by a method as described above can be (automatically or semi-automatically) deployed to a plurality of communication nodes of a respective communications network. For example, the interface arrangement can communicate or be connected to a workplace as describe above or to a system comprising a quantum concept processor that performs the method as described above. The results can then be taken over into the interface arrangement.

Moreover, as preparatory measure for one or more of the above-explained steps of the computer-implemented procedure, an interface can be implemented or used for reading out parameters from the communications network before a respective optimization and for inputting such parameters into the explained computer-implemented optimization procedure. The parameters, for example, comprises a network configuration, adjacency information for a graph description of the network, available capacities in the network and traffic demands to be expected.

Any aspects, features, effects and measures described alone or in combination with each other in the context of the method explained above can be applied to or find analogous representation in aspects, features, effects and measures described alone or in combination with each other in the context of the quantum concept processor or the computer program explained above, and vice versa.

Our methods are further described below under consideration of several implementations with the aid of multiple drawings.

Figure 1:
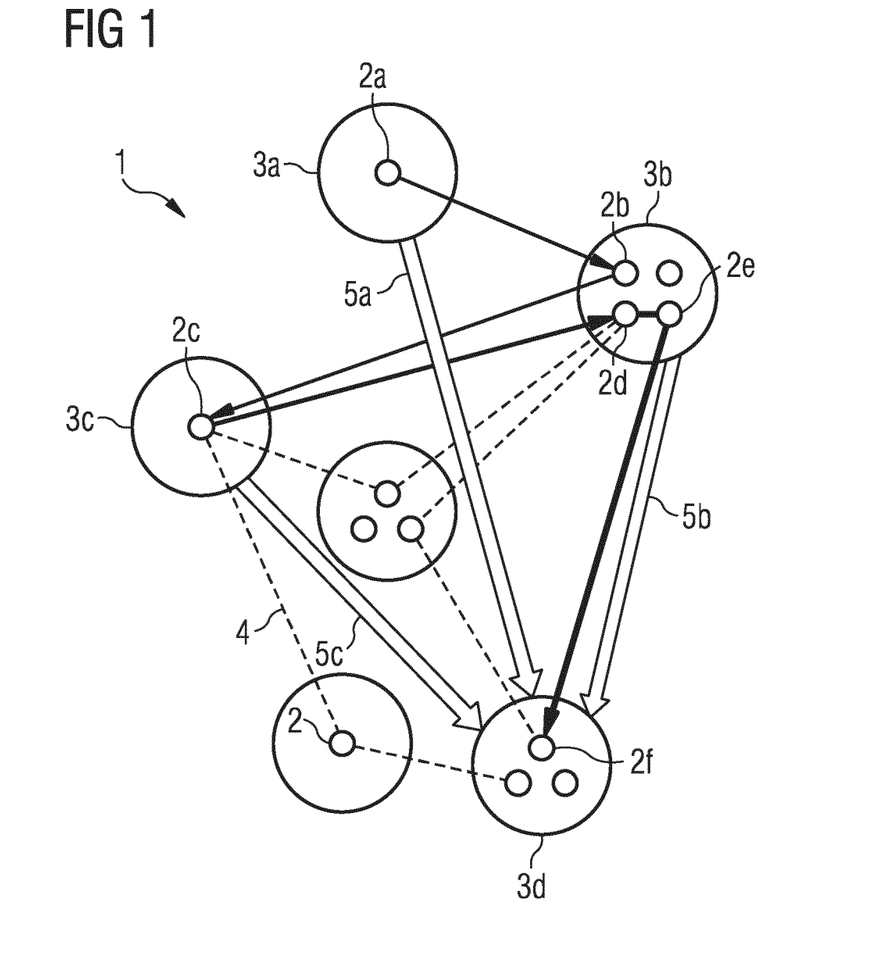
FIG. 1 shows an example of a configuration of a communications network with exemplary routings of traffic demands following a conventional approach.

FIG. 1 shows an exemplary configuration of a communications network 1 with exemplary routings of traffic demands 5a, 5b and 5c following a conventional approach. The communications network 1 comprises a plurality of communication nodes 2, wherein a connection 4 between two adjacent communication nodes 2 is called an edge. This is exemplarily illustrated between the communication node 2 and another communication node 2c, which can communicate with each other over the connection 4. Depending on the historically grown configuration and implementation of the communications network 1, several communication nodes 2 are aggregated into so-called aggregation nodes 3. As exemplarily illustrated in FIG. 1, the communication node 2a is aggregated within aggregation node 3a, whereas other communication nodes 2b, 2d and 2e are aggregated in the aggregation node 3b, for example.

The communication nodes 2 are, for example, so-called label edge routers (LER) that route incoming and outgoing data traffic within the network 1. The aggregation nodes 3 are called Meta nodes and are aggregation zones of LERs in a certain region of the network 1. For example, the aggregation nodes 3 are centralized aggregation zones of determined economic areas or cities between which a communication shall take place. In other applications, the aggregation nodes 3 can, for example, be entities of an industry network or of a traffic network or the like.

The communication network 1, in general, is part-mashed. This means that not all of the communication nodes 2 are connected or connectable with all other communication nodes 2. Instead, there are only several connections 4 (see dotted connections) between several communication nodes 2 implemented in the network 1, which, for example, came from historical evolution of the network 1. The connections 4 between respective communication nodes 2 are, for example, implemented by fibre optic connections. However, other technologies like radio technologies (e.g., 5G) or copper/DSL technologies are applicable as well, in general.

As explained above, FIG. 1 illustrates a certain scenario of traffic demands 5a, 5b and 5c, according to which certain data volumes have to be transferred between respective communication nodes 2 within the network 1. As exemplarily illustrated, a first traffic demand 5a is between the communication node 2a within aggregation node 3a and another communication node 2f within aggregation node 3d. A second traffic demand 5b is between a communication node 2e within aggregation node 3b and again communication node 2f within aggregation node 3d. A third traffic demand 5c is between the communication node 2c within aggregation node 3c and again communication node 2f within aggregation node 3d. Each traffic demand 5a, 5b and 5c, hence, defines a determined volume to be transferred from an origin node to a destination node. In the exemplary scenario according to FIG. 1, the origin node for traffic demand 5a is the communication node 2a, whereas the destination node for the traffic demand 5a is the communication node 2f. Analogously, for traffic demand 5b the origin node is communication node 2e and the destination node is communication node 2f. Further analogously, for traffic demand 5c the origin node is communication node 2c and the destination node is again communication node 2f.

Alternatively, traffic demands can be defined as demands between aggregation nodes 3, irrespective on which internal communication node 2 within a respective aggregation node 3 the communication starts or ends. For example, the demands 5a, 5b and 5c can be defined as demands between the aggregation nodes 3a and 3d (demand 5a), aggregation nodes 3b and 3d (demand 5b) and aggregation nodes 3c and 3d (demand 5c). In such an alternative, there is a "virtual" edge between the respective aggregation node and its internal communication nodes, wherein the virtual edge has a very high capacity. This leads to the effect that it does not play a significant role, on which internal communication node 2 within a respective aggregation node 3 the communication starts or ends.

Each traffic demand 5a, 5b and 5c burdens the network 1 with a usage of the network's capacity, i.e., the capacity of respective connections 4 of potential communication paths between the respective communication nodes 2 in the network 1. In the exemplary scenario of FIG. 1 the traffic demand 5a is transferred from communication node 2a to communication node 2f via the communication nodes 2b, 2c, 2d, 2e, and 2f. In parallel, the traffic demand 5b is transferred simply over the connection 4 between the communication nodes 2e and 2f. Moreover, the traffic demand 5c is transferred from communication node 2c to communication node 2f via the communication nodes 2d, 2e, and 2f. In this scenario, mainly two drawbacks occur. A first drawback lies in the communication paths for the transfer of the traffic demands 5a and 5c being long and rather complicated paths through the network 1. These transfers embed a plurality of communication nodes 2 and connections 4 in the network 1 for transferring the traffic demands 5a and 5c, which can have significant impact on other transfers in the network. A second drawback lies in the fact that all three traffic demands 5a to 5c are finally transferred over the connection 4 between the communication nodes 2e and 2f. Hence, the link capacity of the connection 4 between the nodes 2e and 2f is loaded to a significant extent. This may lead to a failure or an overload of the connection 4 between nodes 2e and 2f, resulting in increased latency or loss of data or the like.

Figure 2A:
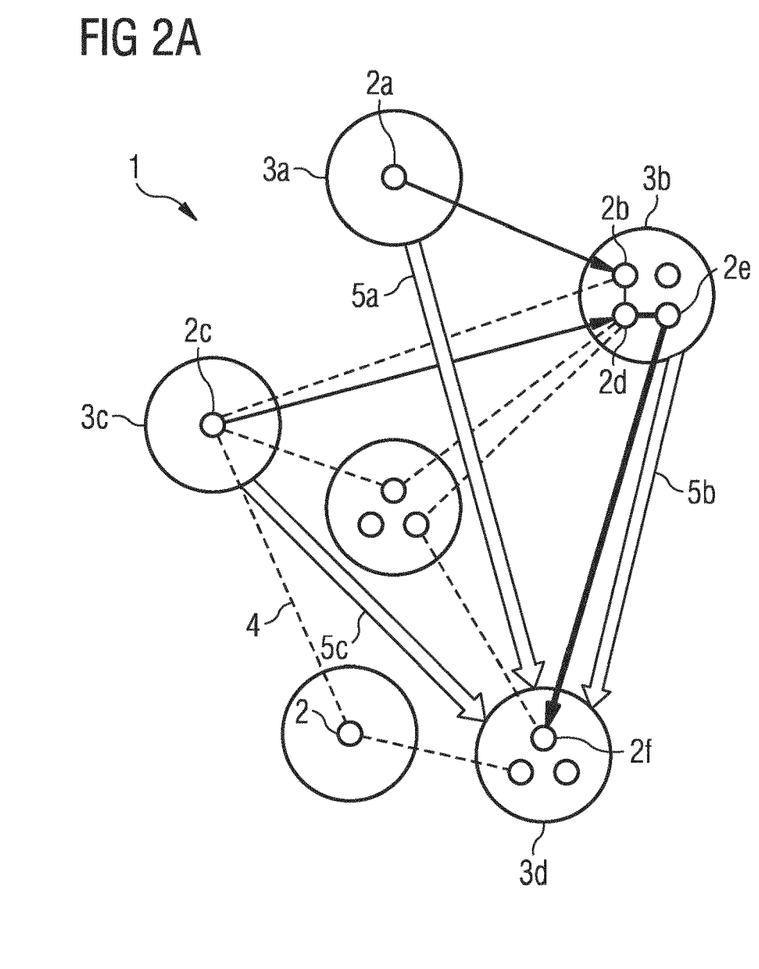
FIG. 2A shows an example of a configuration of a communications network with exemplary routings of traffic demands following an alternative approach.

FIG. 2A shows an exemplary configuration of the communications network 1 with exemplary routings of traffic demands 5a, 5b and 5c (see above) following an alternative approach. In the scenario according to FIG. 2A, for the traffic demand 5a an alternative path is chosen such that traffic demand 5a is transferred on an alternative communication path starting again in communication node 2a and following the communication nodes 2b, 2d, 2e and 2f. The alternative path is, for example, selected by manipulation of link weights of connections 4 in the network 1.

The scenario according to FIG. 2A has the advantage over the scenario of FIG. 1 that the communication path for the transfer of the traffic demand 5a has become closer to a short path strategy, thereby keeping the number of involved communication nodes 2 and connections 4 in the network 1 low (at least lower than in the scenario of FIG. 1) to reduce the impact on other transfers. However, also in the scenario of FIG. 2A the other drawback remains, according to which the connection 4 between the nodes 2e and 2f is still heavily loaded with all three traffic demands 5a to 5c going over this connection of the network 1.

Figure 2B:
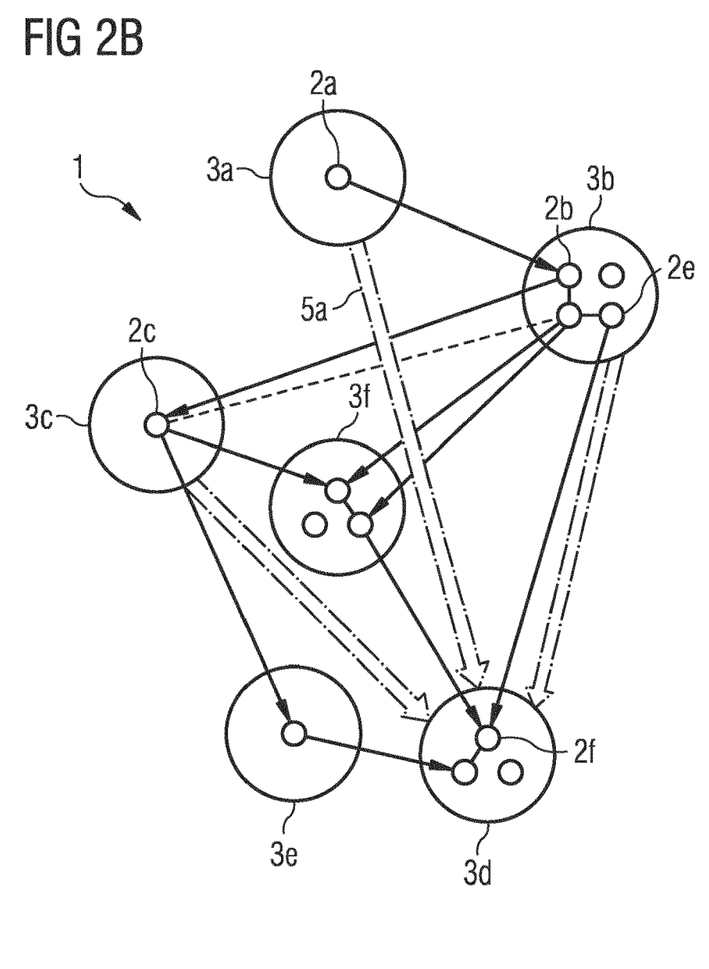
FIG. 2B shows an example of a configuration of a communications network with exemplary routings of traffic demands following our approach.

FIG. 2B shows an exemplary configuration of the communications network 1 according to FIGS. 1 and 2A, but now with exemplary routings of the traffic demands 5a to 5c following our approach. In the scenario of FIG. 2B a plurality of optimized communication paths regarding the data volumes of all three traffic demands 5a to 5c are selected. In this regard, the traffic demands 5a to 5c all have been split into a plurality of sub-demands, each sub-demand representing a discrete fragment of the data volume of an associated one of the traffic demands 5a to 5c. This is illustrated in FIG. 2B with the traffic demands 5a to 5c being only indicated by dashed arrows. Hence, according to the implementation of FIG. 2B, for each traffic demand 5a to 5c there is not only one single prescribed path, but a plurality of (different and separate) paths regarding each sub-demand of each traffic demand 5a to 5c.

The scenario according to FIG. 2B, hence, transfers the overall data volumes of the traffic demands 5a to 5c split into a plurality of fragments (sub-demands) on very different communication paths from respective origins to respective destinations through the network. This approach, hence, follows a discrete MCFR approach. The real value of the scenario according to FIG. 2B lies in the fact that the overall data volume of all traffic demands 5a to 5c, is distributed throughout the network, thereby avoiding that significant load is transferred over single segments in the network which can heavily burden single connections 4 in the network.

Hence, the scenario of FIG. 2B addresses the drawbacks of the approaches according to FIGS. 1 and 2A, thereby achieving a reduced impact and influence between transfers of different traffic demands 5a to 5c as best as possible together with a uniform and optimized distribution of the overall capacity usage of the connections 4 in the network 1 for all traffic demands 5 that have to be transferred in the network 1.

In the following, implementation of the approach according to FIG. 2B is further explained in detail.

The optimization problem to be addressed lies in determining an optimized routing through the network 1 by selecting for each sub-demand as fragment of a respective traffic demand 5 one communication path from a set of optional communication paths such that a mathematically formulated quadratic stress function (core optimization problem) is minimized. This serves the purpose of choosing for all sub-demands of all traffic demands 5 in the network 1 respective communication paths with the effect that the overall capacity usage of connections 4 within the network 1 can be uniformly minimized over the network 1. This avoids connections 4 to be heavily burdened or overloaded, whereas a minor load of other connections 4 could lead to significantly lower such stress.

In achieve the above advantageous effect, a computer-implemented algorithmic method of optimizing the routing within the communication network 1 is implemented. This is explained in the following.

Figure 3:
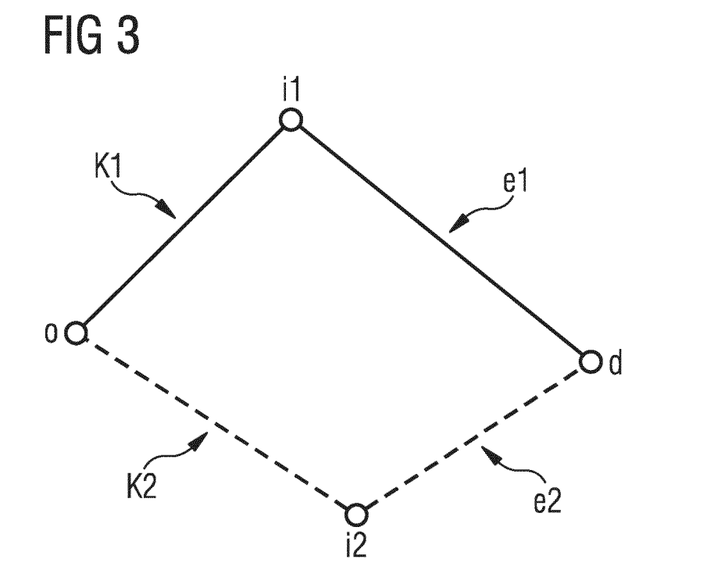
FIG. 3 shows a schematic illustration of an example of optional communication paths for a routing of traffic demands between origin and destination nodes.

FIG. 3 shows a schematic illustration of optional communication paths k1 and k2 for a routing of fragments (sub-demands) of traffic demands between an origin node o and a destination node d. Determined data volume packets of a plurality of sub-demands (into which a traffic demand o, d is split) are to be transferred between o and d. The core optimization problem now lies in choosing and determining optimally distributed communication paths for all sub-demands between o and d such that an overall capacity usage of connections within optional communication paths are minimized such that the overall usage of the capacities in the network is uniformly minimized within the network.

According to FIG. 3, the set of optional communication paths k1 and k2 is specified in advance. This can be done through application of any suitable path planning algorithm that calculates optional communication paths between the origin node o and destination node d for each sub-demand to be transferred. As exemplarily illustrated in FIG. 3, path k1 goes from o over an intermediate node i1 to d. Path k2 goes from o over another intermediate node i2 to d. These are optional communication paths for a routing of data traffic included in each sub-demand between the origin o towards the destination d. The planned paths k1, k2 can be stored in advance in the form of a path box that can be accessed by the algorithm for selecting for each sub-demand one path out of the path box.

FIG. 3 further illustrates two exemplary connections that are further referenced to as edges e1 and e2 and that lie in the optional communication paths k1, k2. The edge e1 is configured between the intermediate node i1 and the destination d, whereas the edge e2 is configured between the intermediate node i2 and the destination d.

Assume, for example, based on the path box k1, k2, different options for a routing of two sub-demands between the origin o and the destination d. One option for the routing per sub-demand is path k1 such that the data traffic is transferred over edge e1. The other option for the routing per sub-demand is path k2 such that the data traffic is transferred over edge e2. As can be seen from these different options for a routing of the data traffic per sub-demand, there are combinations of communication paths for each of the two sub-demands, wherein the two edges e1 and e2 each are burdened with one sub-demand only. This is, for example, given with one sub-demand going path k1 and the other sub-demand going path k2. However, there are also possible combinations of communication paths wherein one of the edges e1 and e2 is significantly and heavily loaded with both sub-demands, whereas the other of the two edges e1 and e2 is not used at all. This is given with both sub-demands going the same path k1 or k2.

The latter combinations have the significant drawback that the capacity usage of one of the edges e1 and e2 is significantly higher, which may result in an overload or failure of the respective edge. Hence, the optimization problem lies in determining and selecting distributed communication paths for all sub-demands between o and d such that the overall capacity usage is distributed over both edges e1 and e2.

To address this optimization problem, fractional capacity usages of all edges within the set of the optional communication paths k1, k2 are calculated for the whole set of sub-demands into which all traffic demands are split. As exemplarily given in FIG. 3, such measure includes the calculation of fractional capacity usages of each of the edges e1 and e2 for each of the sub-demands between o and d. "Fractional capacity usages" of the respective edges means that based on the respective usage capacity limit of each edge, the fraction of the capacity usage is calculated that is required for each sub-demand to be transmitted over this edge.

For example, with regard to FIG. 3, assume that each sub-demand between o and d requires half of the maximum usage capacity of each edge e1 and e2 (i.e., 50% of the capacity) when passing over the respective edge. This means that an edge e1 and e2 is burdened with half of its usage capacity for each sub-demand between o and d when the respective sub-demand passes over the respective edge. In other words, if one sub-demand goes over path k1 and the other sub-demand goes over path k2, the edges e1 and e2 both are burdened with 50% of their usage capacity limit. Otherwise, if both sub-demands go over one and the same path k1 or k2, then the respective edge e1 (for k1) or e2 (for k2) is fully and completely burdened (2×50%=100%), thereby reaching its capacity limit, resulting in a utilization of the entire edge capacity.

Such calculations of fractional capacity usages are performed for all remaining edges lying within the optional communication paths k1 and k2 in the scenario of FIG. 3. The calculated fractional capacity usages are then formulated as terms of a quadratic stress function which is further explained in detail below and in view of FIG. 4B.

Figure 4A:
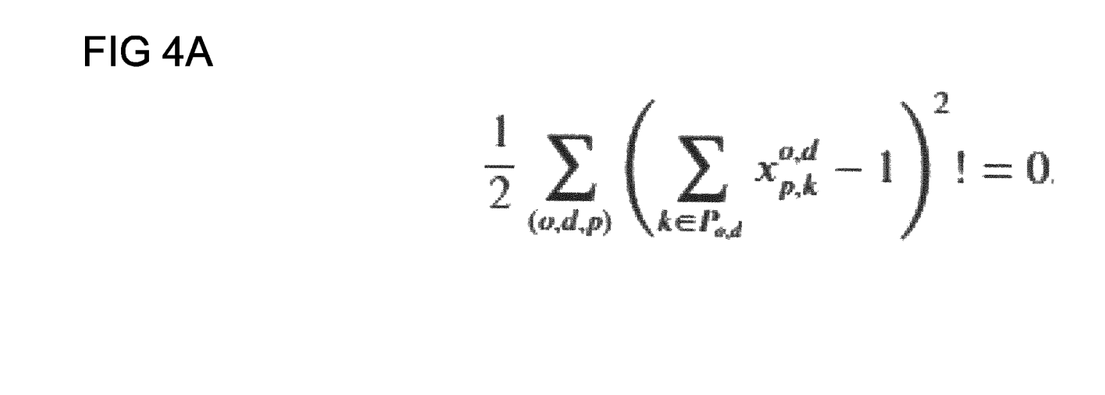
FIGS. 4A and 4B show examples of mathematical formulations of partial optimization problems following our approach.
Figure 4B:
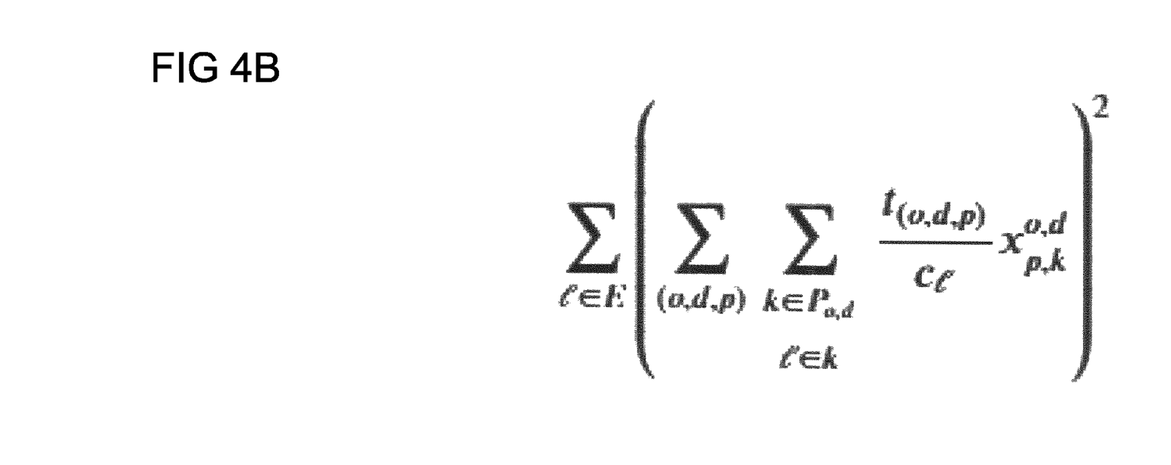

FIGS. 4A and 4B show exemplary mathematical formulations of partial optimization problems following our approach as explained above with regard to the FIGS. 2B and 3. The mathematical formulations of FIGS. 4A and 4B are represented as so-called Hamiltonian functions, short Hamiltonians.

The mathematical formulation of FIG. 4A formulates a path condition according to which each sub-demand between respective origins and destinations (o, d) is to be routed along exactly one path k out of the path box P ($k \in P$).

This means for the scenario of FIG. 3 that each sub-demand between o and d either goes over k1 or over k2.

The mathematical formulation in FIG. 4A is formulated as summed terms of binary variables $x_{p,k}^{o,d}$ that can assume the value "0" or the value "1" (or both with a certain probability) and are represented in a quantum concept processor as bits (or Q-bits as used hereinafter). For each optional path $k \in P$ and considering each sub-demand with the packet size p from an origin o to a destination d, a respective Q-bit $x_{p,k}^{o,d}$ can be set as path variable. The respective Q-bit $x_{p,k}^{o,d}$ is set to the value "1" if a respective sub-demand goes over the respective communication path k, and set to the value "0," if not. Considering the formulation of the Hamiltonian of FIG. 4A, the Hamiltonian must be equal to "0." This is only fulfilled if for each sub-demand p exactly one path $k \in P$ is chosen such that only one path variable $x_{p,k}^{o,d}$ assumes the value "1" and all other path variables $x_{p,k}^{b,d}$ for other paths have the value "0." Otherwise, if none or more than one path k would be chosen, the condition in FIG. 4A would not be fulfilled. The path condition, mathematically formulated as Hamiltonian in FIG. 4A has the effect that exactly one communication path k must be chosen for each sub-demand p to consider this sub-demand p for the overall calculation of an optimized routing of all sub-demands in the network.

The mathematical formulation of the Hamiltonian according to FIG. 4B represents the core optimization problem formulated as a quadratic stress function taking into account the calculated fractional capacity usages of the edges e out of all edges E in the network ($e \in E$), the edges e lying within the set of optional communication paths $k \in P$ for all traffic demands o, d. Hence, the core optimization problem here lies in minimizing the Hamiltonian according to FIG. 4B to find optimized communication paths for all sub-demands p to be transmitted within the network.

Assuming that the expression in FIG. 4A is satisfied, the Hamiltonian of FIG. 4B considers summed terms for each edge e within an optional communication path k considering all sub-demands p between all origins o and destinations d. Thus, the QUBO of FIG. 4B then sums all calculated fractional capacity usages $t_{(o,d,p)}/c_e$ of all edges e that are part of optional communication paths k. $t_{(o,d,p)}$ here represents the volume of a respective sub-demand p and $c_e$ represents the capacity of the respective edge e. The fractional capacity usages $t_{(o,d,p)}/c_e$ are connected with the respective Q-bits (path variables) $x_{p,k}^{o,d}$ into path terms. As explained above, the Q-bits $x_{p,k}^{o,d}$ can assume either the value "0" or the value "1" depending on whether an optional path associated with a respective Q-bit $x_{p,k}^{o,d}$ is taken into account or not.

Considering the scenario of FIG. 3 for two sub-demands p1, p2 and the two edges e1 and 2 exemplary, the Hamiltonian according to FIG. 4B may have the following expression:

$$\left( \frac{t_{(o,d,p1)}}{c_{e1}} \cdot x_{p1,k1}^{o,d} + \frac{t_{(o,d,p2)}}{c_{e1}} \cdot x_{p2,k1}^{o,d} \right)^2 + \left( \frac{t_{(o,d,p1)}}{c_{e2}} \cdot x_{p1,k2}^{o,d} + \frac{t_{(o,d,p2)}}{c_{e2}} \cdot x_{p2,k2}^{o,d} \right)^2.$$

Under the assumption that each sub-demand p1, p2 burdens a respective edge e1, e2 with half of its capacity (50%), as explained above, the above term reaches a minimum, if p1 and p2 are routed over different paths k1, k2. Then, the above term is:

$$\left(\frac{1}{2}\right)^2 + \left(\frac{1}{2}\right)^2 = \frac{1}{2}.$$

Otherwise, if p1 and p2 are routed over one common path k1 or k2 (and the other path is not used), the above term is:

$$\left(\frac{1}{2} + \frac{1}{2}\right)^2 = 1.$$

Hence, the costs/stress for the network is higher in the latter solution, which is worse over the above solution.

The above example shows that a choice of different paths k1, k2 for the two sub-demands p1, p2 is the preferred solution for achieving the optimization target of a distribution of the overall capacity usage throughout the network.

The Hamiltonian of FIG. 4B is generally solved for all sub-demands in a network by a quantum concept processor that runs through different settings of values for the respective Q-bits $x_{p,k}^{o,d}$, thereby calculating the respective result of the Hamiltonian. The target of doing so is to find the minimum of the Hamiltonian for respectively set values of Q-bits $x_{p,k}^{o,d}$. As soon as a respective minimum of the Hamiltonian of FIG. 4B is found, the respective values of the Q-bits $x_{p,k}^{o,d}$ leading to this minimum are stored and finally define respective communication paths of respective sub-demands. This is due to the fact that each Q-bit $x_{p,k}^{o,d}$ defines one communication path for each sub-demand p as explained above. Hence, by calculating a minimum of the Hamiltonian of FIG. 4B by using a quantum concept processor, an optimized routing is calculated by selecting for each sub-demand p one communication path k from the set of optional communication paths.

Figure 5:
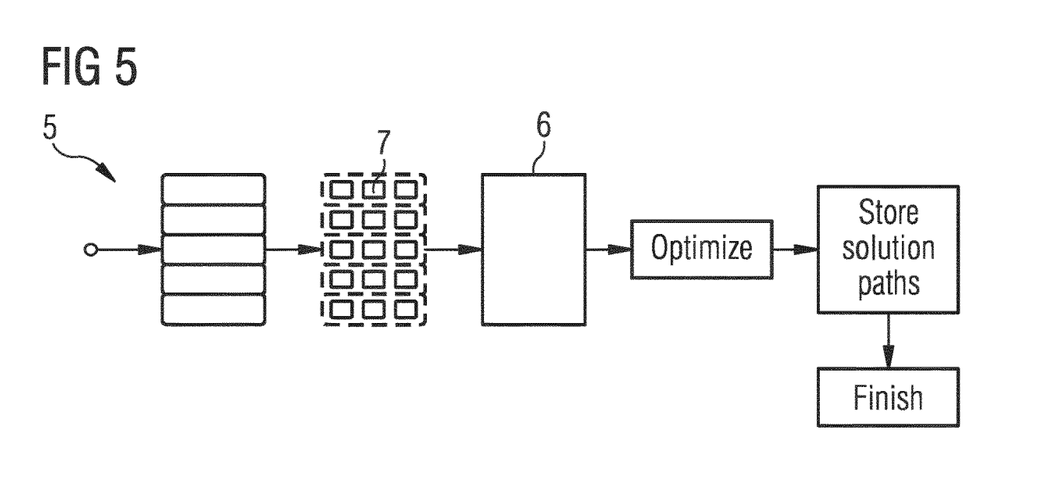
FIG. 5 shows a schematic illustration of an example of an algorithm performing our approach.

FIG. 5 shows an exemplary schematic illustration of an algorithm performing our approach as explained above. FIG. 5 shows the processing of the above explained method steps and procedure considering the set of traffic demands 5. The traffic demands 5 each are split into respective sub-demands 7 with a determined discrete packet size.

The pre-processed sub-demands 7 are then input to an algorithmic procedure within the quantum concept processor 6. For example, the quantum concept processor 6 according to FIG. 5 is configured to address the optimization problem by quantum annealing emulation. The quantum concept processor 6 applies the mathematical formulation of the overall optimization problem according to FIGS. 4A and 4B. The quantum concept processor 6 then calculates for the sub-demands 7 an optimized routing solution of the optimization problem according to FIG. 4B under consideration of the constraint according to FIG. 4A.

After the algorithmic procedure is completed, the finally calculated minimum of the optimization problem according to FIG. 4B is then output from the quantum concept processor 6 for the respective sub-demands 7. The determined communication paths k according to the found optimum of the optimization problem are then stored for the sub-demands 7. The algorithm is then finished.

Hence, by applying a computer-implemented algorithmic procedure according to FIG. 5, which bases on the implementations and explanations above with regard to FIGS. 2B to 4B, an optimized routing can be provided for all sub-demands of all traffic demands over individually selected communication paths through a communication network 1.

Formulation of the optimization problem as QUBO representation has elegant properties regarding the here applied quantum concept computing within processor 6. Nowadays, quantum concept computing still reaches significant limits. However, with computer science more and more developing towards quantum computing, the herein described approach can be further enhanced and developed in future. For example, when quantum computing is more and more applicable for increasing complexities of underlying optimization problems, path boxes can have more and more alternative options for communication paths since more and more path variables can be calculated through quantum computing. Moreover, with quantum computing be more and more applicable, a more and more increasing number of Qbits, more and more complex optimization problems and/or more and more non-linear constraints can be taken into consideration by the approach explained herein.

The herein explained approach is primarily applicable to communication networks. However, the approach can also be applied to any other networks, like railway networks, energy grids, traffic networks and the like in which certain "traffic" or "load" has to be transmitted throughout the network over optimized paths.

The invention claimed is:

1. A computer-implemented method of optimizing a usage distribution in a communications network in which data traffic is routed, wherein the communications network has a plurality of communication nodes connectable over edges of communication paths for a routing of the data traffic, the method comprising:
    capturing a set of traffic demands, each traffic demand specifying a transfer of a determined data volume from an origin node to a destination node among the plurality of communication nodes,
    splitting the traffic demands into sub-demands, wherein the sub-demands are traffic demands split into fragments and one sub-demand represents a fragment of a traffic demand by splitting the data volume of the traffic demand into a determined data volume packet,
    specifying a set of optional communication paths for an individual routing of each sub-demand, wherein edges within the set of optional communication paths are assigned a respective usage capacity limit,
    calculating, for each sub-demand, fractional capacity usages of the edges within the set of optional communication paths, the fractional capacity usages calculated based on the respective usage capacity limit,
    formulating the calculated fractional capacity usages as terms of a quadratic stress function, and
    determining, by using a quantum concept processor, an optimized routing by selecting for each sub-demand one communication path from the set of optional communication paths such that the quadratic stress function is minimized.

2. The method according to claim 1, further comprising:
    specifying a set of path variables, wherein each path variable is associated with one of the sub-demands and one communication path from the set of optional communication paths,
    formulating, in the quadratic stress function, path terms that connect the calculated fractional capacity usages of the edges of a respective communication path from the set of optional communication paths with the path variable associated with the respective communication path from the set of optional communication paths, and
    calculating the path terms, by using the quantum concept processor, to choose for each sub-demand one communication path from the set of optional communication paths such that the quadratic stress function is minimized.

3. The method according to claim 2, wherein the path terms are calculated under consideration of a path condition that each sub-demand is routed along exactly one communication path from the set of optional communication paths.

4. The method according to claim 1, wherein the traffic demands are split into sub-demands with determined discrete data volumes.

5. The method according to claim 1, wherein the quadratic stress function is formulated under consideration of one or both of constraints for the set of traffic demands or the respective sub-demands:
    organization of the communications network in different network domains, or
    latency of the communications network.

6. The method according to claim 1, wherein the set of optional communication paths for an individual routing of each sub-demand is specified under consideration of one or more of:
    one or more redundant optional communication paths associated with a sub-network of the communications network,
    organization of the communications network in different network domains, and
    latency of the communications network.

7. The method according to claim 1, wherein the set of optional communication paths for an individual routing of each sub-demand is specified such that for topologically near origin and destination nodes a smaller number of optional communications paths is selected than for topologically distant origin and destination nodes.

8. The method according to claim 1, wherein the quadratic stress function is formulated as a quadratic unconstrained binary optimization function.

9. A quantum concept processor, configured to perform one or more steps of the method according to claim 1.

10. A computer program comprising instructions that, when the program is executed by one or more processors, that causes each of the one or more processors to perform one or more steps of the method according to claim 1.

11. A computer-readable storage medium on which the computer program of claim 10 is stored.

12. A workplace for a network planner, configured to verify an optimized routing determined by the method according to claim 1.

13. An interface arrangement comprising one or more interfaces to a plurality of communication nodes of a communications network in which data traffic is routed, wherein the interface arrangement is configured to automatically deploy an optimized routing determined by the method according to claim 1 to the communication nodes of the communications network.

14. The quantum concept processor according to claim 9, wherein the quantum concept processor is a digital annealing processing unit.

15. The quantum concept processor according to claim 9, wherein the quantum concept processor is a quantum annealing processing unit.

* * * * *